Figure 1:
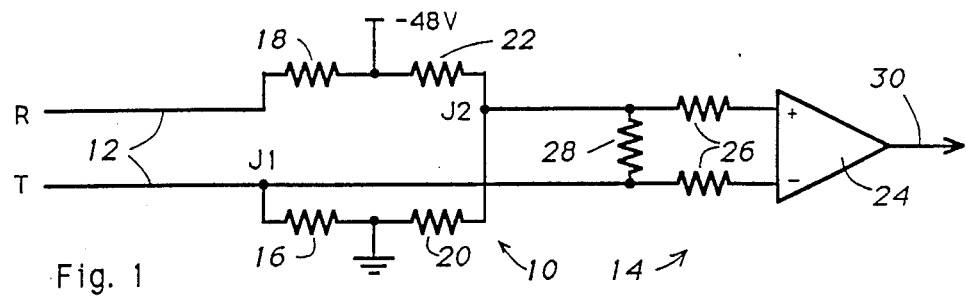

United States Patent [19]

Markovic et al.

[11] Patent Number: 4,935,959
[45] Date of Patent: Jun. 19, 1990

[54] TWO-WIRE TELECOMMUNICATIONS LINE DETECTION ARRANGEMENTS

[75] Inventors: Milan Markovic, Stone Mountain; Alexander Shtulman, Tucker, both of Ga.

[73] Assignee: Northern Telecom Limited, Montreal, Canada

[21] Appl. No.: 344,395

[22] Filed: Apr. 28, 1989

[51] Int. Cl.$^5$ ............................................. H04M 19/00
[52] U.S. Cl. .................................. 379/377; 379/380; 379/385
[58] Field of Search ............... 379/377, 413, 380, 379, 379/391, 392, 402

[56] References Cited

FOREIGN PATENT DOCUMENTS 1201093  8/1970  United Kingdom ................. 379/380

Primary Examiner—Jin F. Ng
Assistant Examiner—Jnancy Augustus
Attorney, Agent, or Firm—Foley & Lardner, Schwartz, Jeffery, Schwaab, Mack, Blumenthal & Evans

[57] ABSTRACT

A loop closure detector for a two-wire telephone line comprises a four-arm resistive bridge, in which the four arms are constituted respectively by a first battery feed resistor, the two-wire line in series with a second battery feed resistor, and two resistors forming a potential divider across the battery voltage which is coupled across one diagonal of the bridge. A voltage sensing circuit, constituted by a comparator or a light emitting diode, is connected across the other diagonal of the bridge to provide an output representing a loop closure state of the line. A ring-ground detector is also described using a similar bridge and voltage sensing arrangements.

4 Claims, 1 Drawing Sheet

TWO-WIRE TELECOMMUNICATIONS LINE DETECTION ARRANGEMENTS

This invention relates to telecommunications line detection arrangements, and is particularly concerned with so-called loop closure and ring-ground detectors for a two-wire telecommunications line.

It is well known to detect the level of current which flows from a supply voltage via battery feed resistors to a two-wire telecommunications line in order to determine the loop closure state of the line, i.e. whether the line is idle with the wires relatively disconnected, or active with the wires interconnected, at its end remote from the detector. Such detection arrangements suffer from disadvantages in that the current is dependent upon not only the resistance, and hence the length, of the line but also the supply voltage. Accordingly, such arrangements tend to be undesirably sensitive to battery supply voltage levels, and may require manual adjustment to set detection threshold levels at an optimum value.

An object of this invention therefore, is to provide an improved two-wire telecommunications line detection arrangement.

According to one aspect of this invention there is provided a two-wire telecommunications line detection arrangement comprising: a four-arm bridge, including a series resistance of at least one wire of a two-wire telecommunications line in one arm of the bridge, and impedance means in each of the other three arms of the bridge; means for providing a supply voltage for the telecommunications line across a first diagonal of the bridge; and voltage sensing means connected across a second diagonal of the bridge for providing an output having first and second states representing respective states of the telecommunications line at an end thereof remote from the bridge.

For a loop closure detection arrangement, preferably said one arm of the bridge and a second, adjacent, arm of the bridge each comprise a respective battery feed resistance for the telecommunications line, the battery feed resistances serving to couple the supply voltage to the two wires of the telecommunications line.

The voltage sensing means conveniently comprises either voltage comparison means or a light emitting diode connected across the second diagonal of the bridge. In each case the voltage sensing means acts substantially as a polarity sensor for sensing the relative polarity of the two junction points. For example the light emitting diode is either forward-biassed to emit light or reverse-biassed to remain dark, depending on the state of the line.

The invention also provides a loop closure detector for a two-wire telecommunications line, comprising: two battery feed resistors for coupling respective wires of the line to a supply voltage and ground, a junction between one of the battery feed resistors and the respective wire of the line defining a first junction point; a potential divider coupled between the supply voltage and ground and defining second junction point; and voltage comparison means connected to the first and second junction points and responsive to differential voltage therebetween for providing an output representing a loop closure state of the line.

In this arrangement a bridge is provided with four resistive arms constituted respectively by one of the battery feed resistors, the series resistance of both wires of the line and the other battery feed resistor, and the two parts of the potential divider.

The invention further provides a ring-ground detector for a two-wire telecommunications line, comprising: first and second resistors, coupled in series and defining a first junction point therebetween, for coupling a ring wire of the line to a supply voltage; a potential divider coupled between the supply voltage and ground and defining a second junction point; and voltage comparison means connected to the first and second junction points and responsive to differential voltage therebetween for providing an output representative of whether or not the ring wire is connected to ground at an end of the line remote from the detector.

Figure 2:
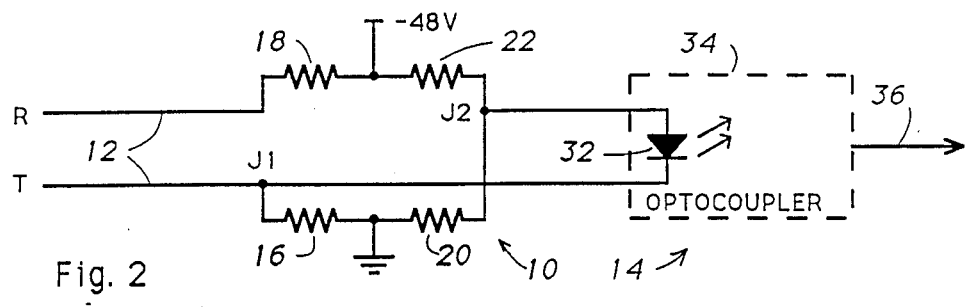
Figure 3:
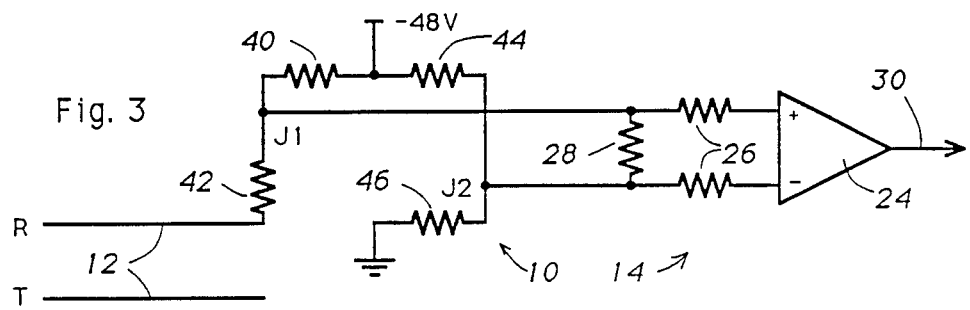
Figure 4:
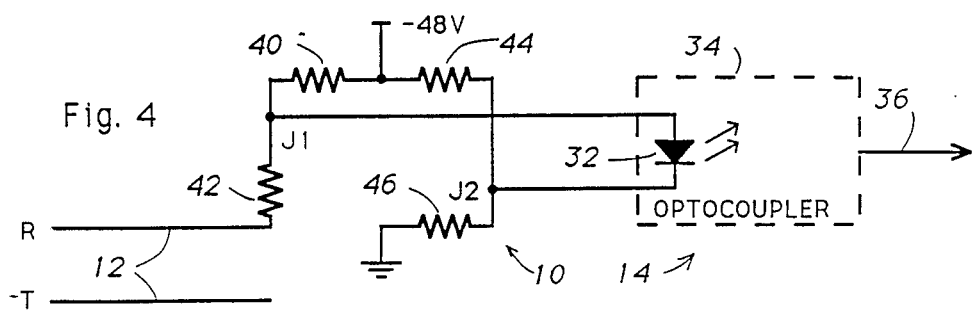

The invention will be further understood from the following description with reference to the accompanying drawings, in which:

FIG. 1 schematically illustrates a loop closure detector in accordance with an embodiment of the invention;

FIG. 2 schematically illustrates a modified form of loop closure detector in accordance with the invention; and FIGS. 3 and 4 schematically illustrate alternative forms of a so-called ring-ground detector in accordance with the invention.

In each of the embodiments of the invention described below with reference to FIGS. 1 to 4, the respective detector comprises a resistive four-arm bridge 10, one arm of which includes at least one wire of a two-wire telephone line 12, and a threshold circuit 14. A telephone central office battery is connected across one diagonal of the bridge 10, and the threshold circuit 14 is connected across the other diagonal of the bridge.

Referring to FIG. 1, illustrating a loop closure detector, the two-wire telecommunications line 12 comprises tip and ring wires T and R respectively which are connected in conventional manner via matched 200Ω battery feed resistors 16 and 18 to ground and a −48 central office battery supply voltage respectively. The resistor 16 connected between ground and a junction point J1 with the wire T constitutes a first arm, and the line 12 in series with the resistor 18 constitutes a second arm, of the resistive bridge 10. Third and fourth arms of the bridge 10 are constituted respectively by a 200Ω resistor 20 connected between ground and a junction point J2, and a 2.6 kΩ resistor 22 connected between the junction point J2 and the −48 volt supply voltage, these resistors 20 and 22 forming a potential divider between the −48 volt supply voltage and ground.

The threshold circuit 14 comprises a comparator or differential amplifier 24 having differential inputs coupled via current limiting resistors 26, for example each having a resistance of 100 kΩ, to the junction points J1 and J2. A resistor 28 connected between the points J1 and J2, and having a resistance of for example 10 kΩ, determines an input impedance of the threshold circuit 14.

In operation, in an idle condition the line 12 has a high impedance between the wires T and R at its end remote from the bridge 10, so that the point J1 is at a potential close to ground potential and is more positive than the potential at the point J2, causing the comparator 24 to provide a low or zero voltage at its output 30. In an active state of the line 12 its wires T and R are interconnected at the end of the line remote from the bridge 10, i.e. the loop is closed, whereby the resistance of the second arm of the bridge 10 is reduced to 200Ω plus the series resistance of the two wires R and T, which is in this embodiment assumed to be less than 2.4 kΩ. Accordingly, the point J1 becomes more negative than the point J2, causing the comparator 24 to provide a high or positive voltage at its output, representing the loop closure.

The circuit of FIG. 1 is relatively insensitive to changes in the −48 volt central office battery supply voltage, and provides a distinct and precise indication of loop closure without relying on current sensing as in the prior art. The resistance of 2.6 kΩ of the resistor 22 is determined by the maximum line resistance of 2.4 kΩ (1.2 kΩ for each of the wires T and R) plus the 200Ω resistance of the battery feed resistor 18, and can be changed for other values of maximum line resistance.

FIG. 2 illustrates a modified form of loop closure detector, in which the threshold circuit 14 comprises a light emitting diode (led) 32 which forms part of an optocoupler 34 of known form. The led 32 is connected between the junction points J1 and J2 for conducting current from the point J2 to the point J1. In this circuit the resistance of the resistor 20 of the bridge 10 is reduced, for example to 100Ω, to compensate for the forward voltage drop of the led 32.

In operation of the detector of FIG. 2, when the line 12 is open the led 32 is reverse biassed so that it is not lit and the optocoupler 34 produces a first output voltage on an output line 36, and when the loop is closed the led 32 is forward biassed and lit so that the optocoupler produces a second, different, output voltage on the line 36. As in the detector of FIG. 1, the circuit is relatively independent of supply voltage changes, and the resistance values can be modified for different line lengths and hence resistances.

FIG. 3 illustrates a so-called ring-ground detector in accordance with the invention. Such a detector is useful for distinguishing between idle and active states of a two-wire telecommunications line in which the ring wire R is grounded, at its end remote from the detector, to indicate the active state.

In the ring-ground detector of FIG. 3, the threshold circuit 14 is the same as that of FIG. 1, and its inputs are connected (with reversed polarity compared with FIG. 1) to junction points J1 and J2 of the bridge 10. The four arms of the bridge 10 are constituted respectively by a resistor 40 connected between the junction point J1 and the −48 volt central office battery supply voltage, the ring wire R and a resistor 42 connected between this wire and the junction point J1, a resistor 44 connected between the junction point J2 and the −48 volt supply, and a resistor 46 connected between the junction point J2 and ground. The resistors 40 and 44 have equal resistance of for example 200Ω each, the resistor 42 can have a similar resistance of 200Ω, and the resistor 46 is selected to have a resistance, for example 1.5 kΩ, equal to the resistance of the resistor 42 plus the maximum resistance of the ring wire R of the line 12, which is for example 1.3 kΩ in this case.

As should be appreciated from the above description, if the ring wire R, having a series resistance less than 1.3 kΩ, is grounded at its remote end, the junction point J1 is more positive than the junction point J2 so that the comparator 24 produces a high or positive voltage on the line 30 indicating an active state. Conversely, if the ring wire is not grounded indicating an idle condition, the junction point J1 is more negative than the junction point J2 so that the comparator 24 produces a low or negative voltage on the line 30 indicating this idle condition.

FIG. 4 illustrates a modified form of ring-ground detector, in which the threshold circuit 14 has the same form as that in FIG. 2, the resistance of the resistor 44 in the bridge 10 being reduced for example to 100Ω to accommodate the forward voltage drop of the led 32 as in the detector of FIG. 2. The operation of the detector of FIG. 4 will be clear from the preceding description.

In the embodiments of the invention described above with reference to FIGS. 1 and 3 the threshold circuit 14 serves as a polarity detector for distinguishing between opposite relative polarities of the junction points J1 and J2. In the embodiments of FIGS. 2 and 4 the threshold circuit 14 serves effectively to distinguish between relative potentials between the points J1 and J2 respectively above or below a light-emitting threshold voltage of the led 32. Although the latter embodiments are less sensitive, in each case there is a distinct threshold, and hence a clear distinction between active and idle conditions as represented on the output line 30 or 36, which is relatively independent of battery supply voltages and which does not involve current sensing techniques as in the prior art.

Although particular embodiments of the invention have been described above with reference to the drawings, numerous modifications, variations, and adaptations may be made thereto without departing from the scope of the invention as defined in the claims.

What is claimed is:

1. A loop closure detector for a two-wire telecommunications line, comprising:
   two battery feed resistors for coupling respective wires of the line to a supply voltage and ground, a junction between one of the battery feed resistors and the respective wire of the line defining a first junction point;
   a potential divider coupled between the supply voltage and ground and defining a second junction point; and
   voltage comparison means connected to the first and second junction points and responsive to differential voltage therebetween for providing an output representing a loop closure state of the line.

2. A detector as claimed in claim 1 wherein the voltage comparison means comprises a light emitting diode.

3. A ring-ground detector for a two-wire telecommunications line, comprising:
   first and second resistors, coupled in series and defining a first junction point therebetween, for coupling a ring wire of the line to a supply voltage;
   a potential divider coupled between the supply voltage and ground and defining a second junction point; and
   voltage comparison means connected to the first and second junction points and responsive to differential voltage therebetween for providing an output representative of whether or not the ring wire is connected to ground at an end of the line remote from the detector.

4. A detector as claimed in claim 9 wherein the voltage comparison means comprises a light emitting diode.

* * * * *